United States Patent [19]

Brown et al.

[11] Patent Number: 4,784,363
[45] Date of Patent: Nov. 15, 1988

[54] RADIAL PIPE MOUNT

[75] Inventors: Garland L. Brown; Roy E. Hoffman, Jr., both of Newport News, Va.; Thomas J. Quenville, Rome, N.Y.

[73] Assignee: The United States of America as represented by the Secretary of the Navy, Washington, D.C.

[21] Appl. No.: 55,951

[22] Filed: Jun. 1, 1987

[51] Int. Cl.$^4$ ............................................. F16L 3/00
[52] U.S. Cl. ...................................... 248/610; 248/62
[58] Field of Search ............... 248/610, 62, 67.5, 74.1, 248/74.2, 74.4, 74.5, 103, 317; 24/284; 16/2

[56] References Cited

U.S. PATENT DOCUMENTS

| | | | |
|---|---|---|---|
| 2,310,622 | 2/1943 | Ellinwood | 248/62 |
| 3,366,356 | 1/1968 | Fisher | 16/2 |
| 3,530,899 | 9/1970 | Breeding | 248/62 |
| 3,564,676 | 2/1971 | Oeser | 248/74.4 |
| 3,606,218 | 3/1969 | Enlund et al. | 248/74 |
| 3,684,223 | 8/1972 | Logsdon | 248/74 |
| 3,848,839 | 11/1974 | Tillman | 248/62 |
| 3,894,309 | 7/1975 | Yuda | 16/2 |
| 4,037,810 | 7/1977 | Pate | 248/68 |
| 4,172,578 | 10/1979 | Pate | 248/74 |

FOREIGN PATENT DOCUMENTS

| | | | |
|---|---|---|---|
| 2162662 | 6/1973 | Fed. Rep. of Germany | 248/74.1 |
| 2395418 | 2/1979 | France | 248/74.1 |
| 2457403 | 1/1981 | France | 248/62 |
| 849761 | 9/1960 | United Kingdom | 16/2 |

Primary Examiner—J. Franklin Foss
Assistant Examiner—Robert A. Olson
Attorney, Agent, or Firm—Thomas M. Phillips

[57] ABSTRACT

A radial pipe mount has a spoked elastomeric element around the pipe with the spokes pointing outward. A circular ring retains the spoked elastomeric element and has a support leg attached to it. The cross-section of the ring is a semi-elliptic of formula $y^2/a^2 + x^2/b^2 = 1$.

3 Claims, 3 Drawing Sheets

4,784,363

RADIAL PIPE MOUNT

BACKGROUND OF THE INVENTION

1. Field of the Invention

The present invention relates to pipe hangers, and more particularly to a radial pipe mount having noise isolation characteristics.

2. Description of the Prior Art

In submarines isolation of the noise critical piping systems currently uses a "V" design with two machinery mounts, associated hardward and massive support structures. The result is that space onboard is at a premium as these structures use up nearly all available space in frame bays and even encroach on headroom space in many areas. Thus, a simpler, more compact pipe hanger is desired with low frequency isolation capability and shock damage resistance equal to or better than current hangers.

SUMMARY OF THE INVENTION

Accordingly, the present invention provides a radial pipe mount which has a spoked elastomeric element around the pipe with the spokes pointing outward. A circular ring retains the spoked elastomeric element and has a support leg attached to it. The cross-section of the ring is a semi-elliptic of formula $y^2/a^2 + x^2/b^2 = 1$.

Therefore, it is an object of the present invention to provide a radial pipe mount having compact dimensions, low resonant frequency, comparatively good low frequency vibration isolation characteristics, and excellent resistance to shock damage.

Another object of the present invention is to provide a radial pipe mount which is simple in design and less expensive than previous mounts.

Other objects, advantages and novel features of the present invention will be apparent from the following detailed description when read in conjunction with the appended claim and attached drawing.

DESCRIPTION OF THE PREFERRED EMBODIMENT

Figure 1:
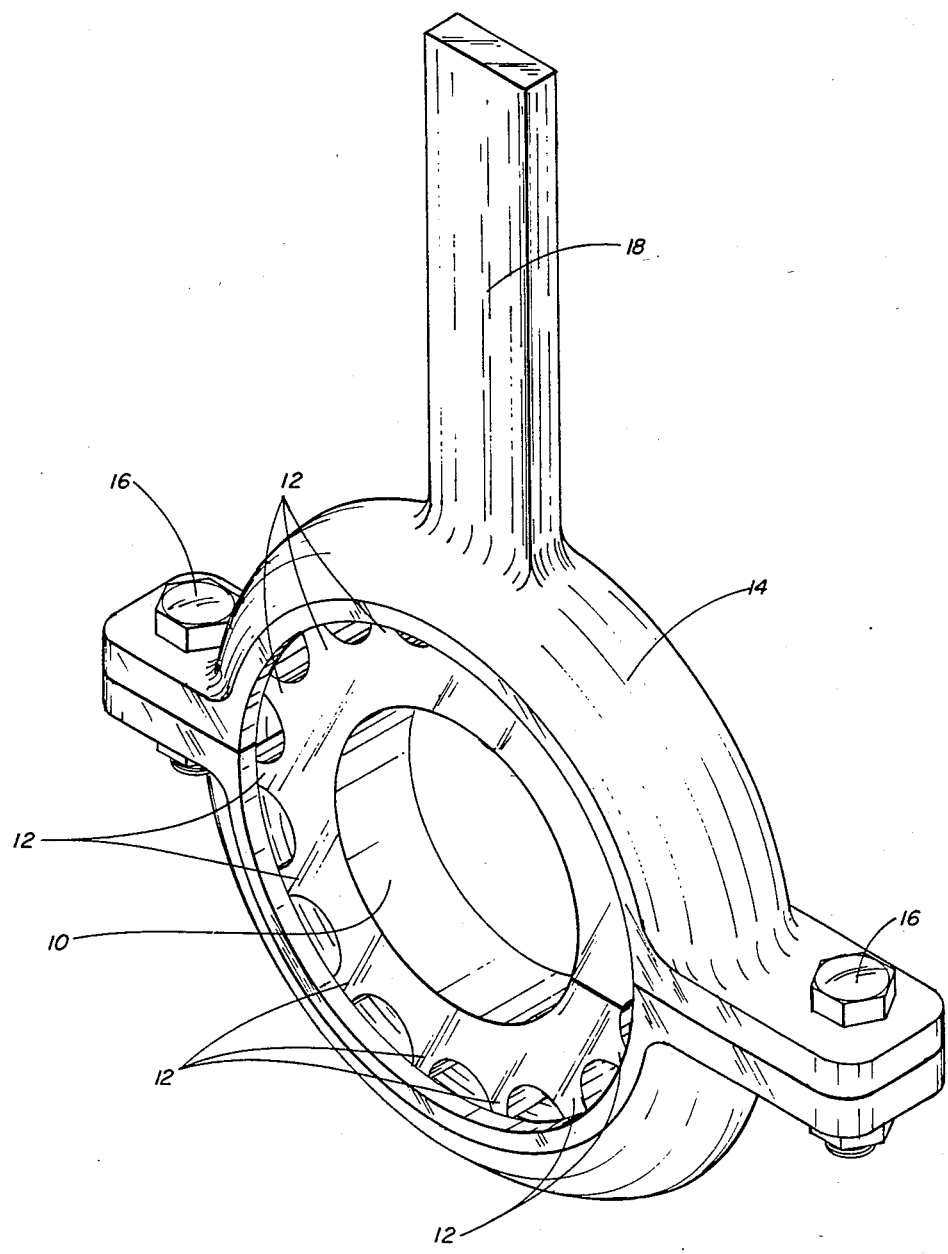
FIG. 1 is a perspective view of a radial pipe mount according to the present invention.
Figure 2:
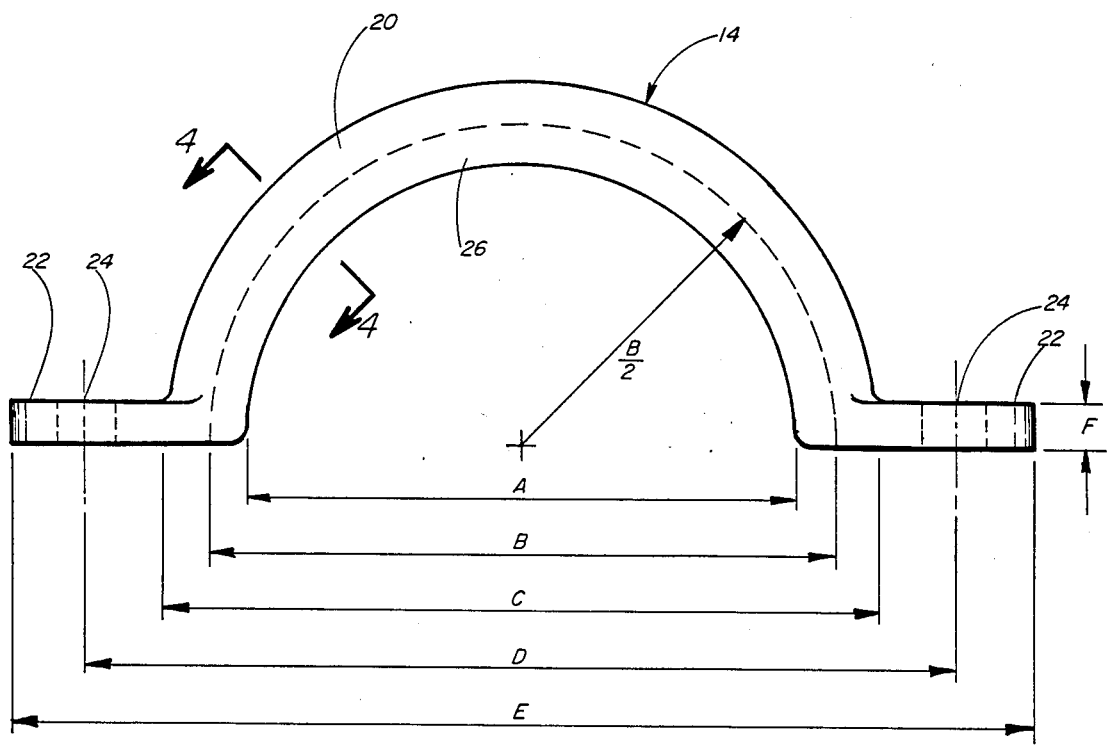
FIG. 2 is a side plan view of a segment of the retaining ring for the radial pipe mount.
Figure 3:
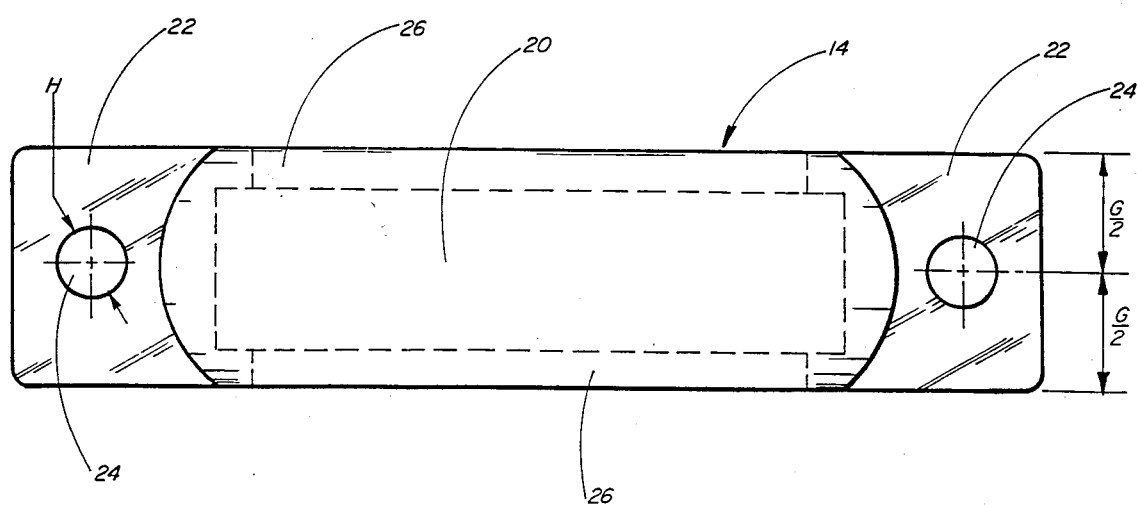
FIG. 3 is a top plan view of the segment of FIG. 2.
Figure 4:
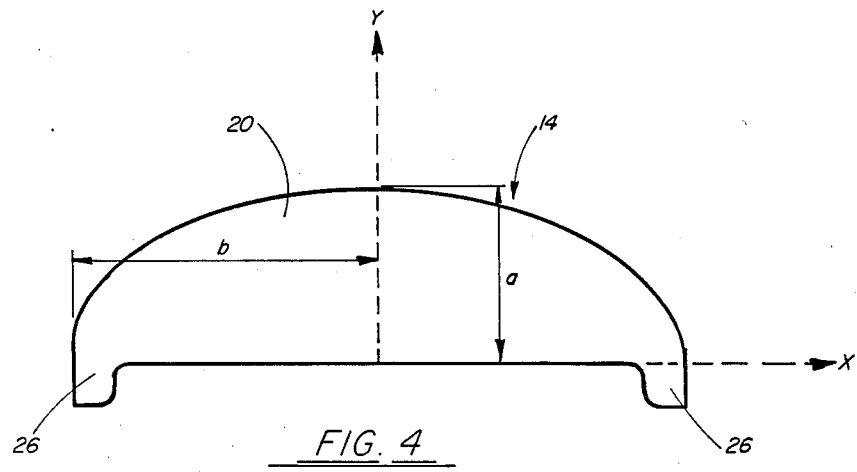
FIG. 4 is a cross-sectional view of the segment of FIG. 2 taken along the line 4—4.

Referring to FIG. 1 a radial pipe support is shown having three basic parts: an elastomeric insert 10 having radial spokes 12; a two-part retaining ring 14 surrounding the insert and having fastening means 16; and a support arm 18 attached to the retaining ring. The retaining ring 14, as shown in FIGS. 2–4, has two semi-circular halves 20 with a flange 22 at each end through which attachment holes 24 are drilled. The semi-circular half 20 has a lip 26 on each side to assist in retaining the insert 10 within the retaining ring 14 against axial forces. To provide rigidity without low frequency resonance the cross-section of the semi-circular half 20 is in the form of half of an ellipse with the equation $y^2/a^2 + x^2/b^2 = 1$, the width, b, being the semi-major axis and the height, a, being the semi-minor axis. The support arm 18 is welded to one of the semi-circular halves 20.

Figure 5:
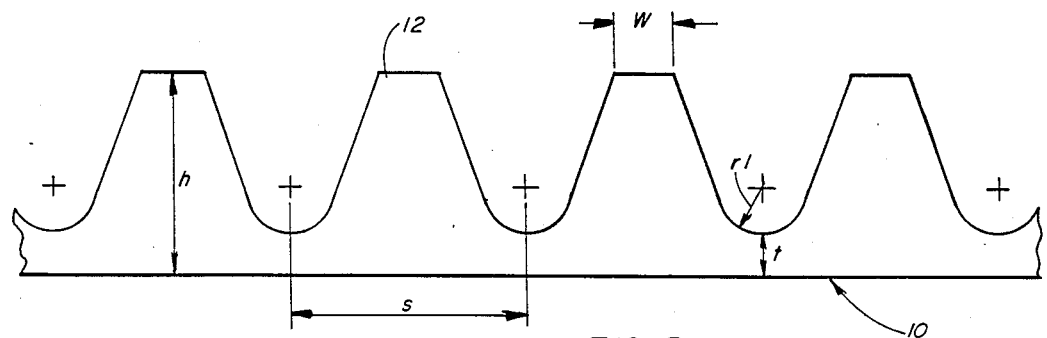
FIG. 5 is a side plan view of a portion of an elastomeric insert for the radial pipe mount for larger pipe sizes.
Figure 6:
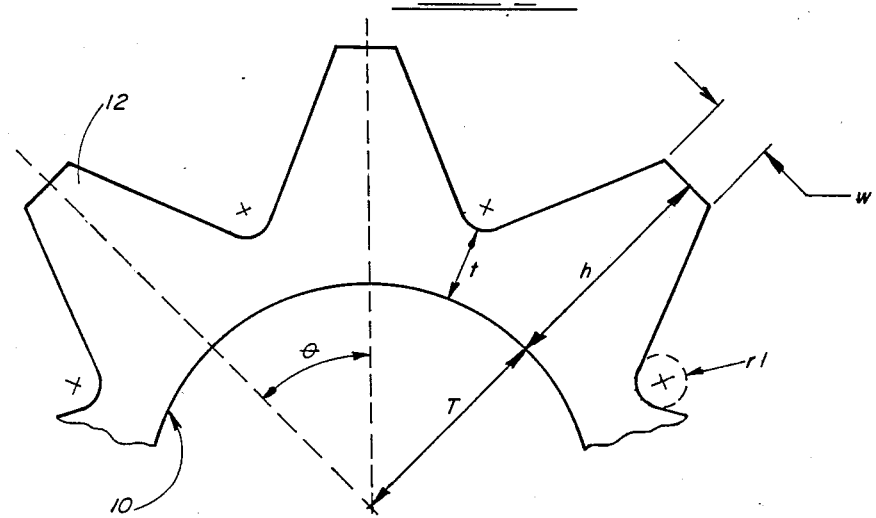
FIG. 6 is a side plan view of a portion of the elastomeric insert for smaller pipe sizes.

The elastomeric insert 10, of a material such as 30 durometer neoprene, has a toothed or spoked design as shown in FIG. 5 with a base thickness, t, a tooth height, h, tooth width, w, valley radius, r', and a spacing between teeth, s. The insert 10 is bent around a pipe with the teeth 12 projecting outwardly. The semi-circular halves 20 of the retaining ring 14 are mounted around the insert 10 and secured by any suitable means 16 such as bolt and lock-nut through the attachment holes 24.

Typical dimensions for the retaining ring 14 depicted in FIGS. 2 and 3 are shown in Table I below for a range of pipe sizes from 1 inch through 8 inch ips. Table II shows corresponding dimensions at the cross-section of retaining ring 14 shown in FIG. 4.

TABLE I

RETAINING RING MAJOR DIMENSIONS
(All dimensions are in inches)

| Pipe Size | A | B | C | D | E | F | G | H |
|---|---|---|---|---|---|---|---|---|
| 1 | 3 9/16 | 4 1/16 | 4 9/16 | 5 9/16 | 6 9/16 | 1/4 | 1 1/2 | 7/16 |
| 2 | 4 3/4 | 5 1/4 | 5 7/8 | 7 1/4 | 8 3/8 | 5/16 | 1 1/2 | 9/16 |
| 3 | 5 1/4 | 5 3/4 | 6 7/8 | 8 | 9 3/8 | 5/16 | 1 3/4 | 9/16 |
| 5 | 7 7/16 | 7 15/16 | 9 9/16 | 10 13/16 | 12 3/16 | 3/8 | 3 | 9/16 |
| 8 | 10 9/16 | 11 1/16 | 14 5/16 | 16 1/2 | 18 1/16 | 3/8 | 4 | 11/16 |

TABLE II

RETAINING RING CROSS-SECTIONAL DIMENSIONS
(All dimensions are in inches)

| Pipe Size | a | b |
|---|---|---|
| 1 | 1/4 | 3/4 |
| 2 | 3/8 | 3/4 |
| 3 | 7/16 | 7/8 |
| 5 | 13/16 | 1 1/2 |
| 8 | 1 3/8 | 2 |

The lip 26 is 3/4 inch square in cross section for all applications, though with rounded corners as shown in FIG. 4. The support arm 18 may be attached to a convenient point on the hull structure of the vessel, for example by welding.

Table III shows typical cross-sectional dimensions for two different lengths of support arm 18 together with corresponding sizes of the fastening means.

TABLE III

SUPPORT LEG AND BOLT SIZES
(All dimensions are in inches)

| Pipe Size | Support Leg Length = 6" | Support Leg Length = 12" | Bolt Size |
|---|---|---|---|
| 1 | 1¼ × ¼ | 1¼ × ½ | ⅜-16UNC-2A |
| 2 | 1¼ × ½ | 1½ × ½ | ½-13UNC-2A |
| 3 | 1½ × ½ | 1½ × ½ | ½-13UNC-2A |
| 5 | 2 × ½ | 2½ × ½ | ½-13UNC-2A |
| 8 | 2½ × ¾ | 3 × ¾ | ⅝-11UNC-2A |

The teeth 12 are bonded to the retaining ring 14 by a suitable epoxy adhesive. A cyanoacrylate adhesive is used to bond the ends of the insert 10 together. A lubricant is applied between the pipe surface and the insert 10 to allow for axial slip of the pipe. Typical dimensions for the insert 10 are shown in Table IV for a range of pipe sizes.

TABLE IV

| Nominal Pipe Size | r | φ | h | Number of Teeth | w | r' | s | t | Insert Width |
|---|---|---|---|---|---|---|---|---|---|
| 1" | 2 1/32" | 72° | 1 7/16 | 5 | ⅜" | 3/32" | — | ½" | 1" |
| 2" | 1 3/16" | 51° 25' | 1 7/16 | 7 | ⅜" | 3/32" | — | 7/16" | 1" |
| 3" | — | — | 1¼ | 7 | 4/10" | 5/16" | 1½" | ¾" | 1¼" |
| 5" | — | — | 1¼ | 11 | 4/10" | 5/16" | 1½" | ¾" | 2½" |
| 8" | — | — | 1¼ | 17 | 4/10" | 5/16" | 1½" | ¾" | 3½" |

Thus, the present invention provides a radial pipe mount which is an improved apparatus for resiliently supporting piping onboard submarines having compact dimensions, low resonant frequency, better vibration isolation characteristics than previous supports, and excellent resistance to shock damage.

We claim:

1. A radial pipe mount comprising:
   an elastomeric insert for bending around a pipe, said elastomeric insert having radial spokes;
   a retaining ring surrounding said elastomeric insert and retaining said elastomeric insert around said pipe with said radial spokes pointing outward;
   said retaining ring being comprised of a semi-ellipse in cross-section to provide rigidity without low frequency resonance; and
   means attached to said retaining ring for supporting said radial pipe mount.

2. The radial pipe mount as recited in claim 1 wherein said retaining ring further comprises an integral lip entirely around the circumference on each side, said lip extending inwardly toward said pipe to retain said elastomeric insert against axial forces.

3. The radial pipe mount as recited in claim 1 wherein the form of the semi-ellipse is expressed with equation $y^2/a^2 + x^2/b^2 = 1$, the width b, being the semi-major axis and the height a, being the semi-minor axis.

* * * * *